United States Patent [19]
Wells

[11] Patent Number: 5,304,029
[45] Date of Patent: Apr. 19, 1994

[54] LAMINATION SEPARATION PROCESS

[75] Inventor: Donald P. Wells, Racine, Wis.

[73] Assignee: Emerson Electric Co., Inc., Racine, Wis.

[21] Appl. No.: 972,613

[22] Filed: Nov. 6, 1992

[51] Int. Cl.⁵ .............................................. B21D 31/06
[52] U.S. Cl. .................. 414/788; 414/798.2; 29/596; 29/732; 29/738; 225/103
[58] Field of Search ............ 414/788, 907, 798.2; 29/596, 732, 738; 225/103

[56] References Cited

U.S. PATENT DOCUMENTS

| | | | |
|---|---|---|---|
| Re. 31,945 | 7/1985 | Magni | 29/732 |
| 1,762,017 | 6/1930 | Grenzer | 29/738 |
| 3,174,632 | 3/1965 | Evron | 414/788 |
| 3,845,547 | 11/1974 | Reynolds | 29/596 |
| 4,383,356 | 5/1983 | Fitchner | 414/788 |
| 4,400,872 | 8/1983 | Berges | 29/738 |
| 4,602,427 | 7/1986 | Britting et al. | 29/732 |
| 4,677,744 | 7/1987 | Muller | 29/732 |
| 4,758,126 | 7/1988 | Johnson et al. | 414/907 |
| 5,011,365 | 4/1991 | Sassi | 29/732 |

FOREIGN PATENT DOCUMENTS

| | | | |
|---|---|---|---|
| 152120 | 4/1982 | Japan | 29/738 |
| 130406 | 8/1982 | Japan | 29/738 |
| 647752 | 2/1979 | U.S.S.R. | 29/738 |

Primary Examiner—Michael S. Huppert
Assistant Examiner—Gregory A. Morse
Attorney, Agent, or Firm—Ryan, Kees & Hohenfeldt

[57] ABSTRACT

Separation of individual laminations is performed by positioning a row of the laminations against a metal tray or similar supporting surface. The opposite ends of the row are engaged between platens which are oriented parallel to each other at a first angle relative to the axis of the row. While compressing the row between the platens, a force is applied against a side of the row to compact it against the supporting surface. The row is the engaged between platens that are oriented parallel to each other but at a second angle relative to the axis of the row, and a compacting force is again applied while the row is compressed between the platens. At least one of the first and second angles is an oblique angle.

18 Claims, 7 Drawing Sheets

LAMINATION SEPARATION PROCESS

FIELD OF THE INVENTION

This invention relates to apparatus and processes for the separation of individual lamina from a stack in which they are somewhat adhered together. More particularly, the invention relates to the separation of metal laminations used to manufacture stators for electric motors.

BACKGROUND OF THE INVENTION

In the manufacture of a laminated stator core used in an electric motor, thin stator laminations are punched in high speed presses. After punching, the laminations undergo a heat treating process called annealing, which gives the laminations proper electromechanical properties for an efficient high quality motor. To begin the annealing process laminations are heated to 900° F. to burn off contaminants such as lubricating oil. Then the laminations are transferred to a multistage annealing oven where they are gradually brought up to a temperature of 1500° F. and cooled back down to 500° F. Subsequently, trays of laminations are transferred to a cooling chamber where they are brought down to handling temperature.

The annealing process removes carbon from the steel. An unavoidable consequence of this process is the fusing of the laminations due to molecular bonding at the contacting surfaces of the laminations. To be useable, the laminations must be separated, which is currently done by a manual process referred to as cracking. The worker picks up a bulk stack of annealed laminations weighing as much as 26 pounds and raises it approximately 2 feet above a metal table and slams it down. For optimum results, this must be repeated at least twice for each bulk stack. Even with a substantial expenditure of energy, the laminations are not always cleanly separated. Additionally, this cracking process can result in bent laminations which must be scrapped.

SUMMARY OF THE INVENTION

A principle object of the invention is to provide an ergonomically designed cracking process which eliminates the physical stresses caused by the current manual process and increases productivity. In accordance with one aspect of the invention a lamination cracking and material handling system consists of multiple stages including an empty pallet destacker, tilt and load station, multistage cracking stations, and a full pallet stacker, all joined by automatic conveyors.

In accordance with another aspect, pallets are used to support and convey the laminations through the various stations and serve as a supporting surface during the separation process. Pallet destacking, conveying and tilting equipment are preferably incorporated into the system.

In accordance with still further aspects of the invention several mechanisms are used to compact the laminations, each in a different fashion to ensure complete separation. The pallets are automatically conveyed under each of the mechanisms. Preferably each pallet is in the form of a V-shaped trough in which the laminations rest on two surfaces. The laminations are preferably tilted first in one orientation and compressed from the side and then tilted in a reverse orientation and compressed again to apply shearing forces in different directions between the individual laminations. A variety of compressive forces, such as impacts from striking bars and forces applied by moving rollers, are applied to cause shifting of the laminations relative to each other to ensure separation of each of the laminations.

In accordance with a preferred embodiment, the cracking process employs six stages. The first stage is used to straighten and align rows of laminations supported in a pallet. This is done by means of a steel angle brought down on the row which is held between parallel oriented platens engaging each end of the row. The second stage uses a hydraulically driven straight bar in place of the steel angle. Platens which are parallel to each other, but tilted relative to the row, compress the row endwise and tilt the row at a slight angle. The impact bar is preferably brought down with a sharp blow on the exposed side of the row. The platens are rotated 180° or pivoted to reverse the angle of tilt of the row and the row is struck again. The angle of tilt in each direction is selected to allow each application of downward force to produce a shearing action between the individual laminations. The third stage uses similar tilting but the impact bar is replaced by a roller that travels across the top of the row of laminations. Stages 4 and 5 also utilize tilting of the row, in alternating directions but replace the roller with a rapidly cycling vibratory impact device that travels the length of the row. Stage 6 uses a steel angle to align the row of laminations vertically relative to the supporting pallet. In this manner, by varying the angle, direction and intensity of the force applied, the laminations are thus completely separated and ready for use.

Briefly summarized, separation of individual laminations is performed by positioning a row of the laminations against a metal tray or similar supporting surface. The opposite ends of the row are engaged between platens that are oriented parallel to each other at a first angle relative to the axis of the row. While compressing the row between the platens, a force is applied against a side of the row to compact it against the supporting surface. The row is TM the engaged between platens that are oriented parallel to each other but at a second angle relative to the axis of the row, and a compacting force is again applied while the row is compressed between the platens. At least one of the first and second angles is an oblique angle.

DRAWINGS

The invention will be further set forth in the following detailed description and accompanying drawings, wherein.

DETAILED DESCRIPTION

Referring to the drawings there is seen apparatus 20 of this invention. Laminations 22 which are in the shape of individual flat lamina each of similar size and shape, are stacked together in rows as seen, for example, in FIG. 12. The rows of laminations 22 are supported on a supporting surface that is preferably in the form of a series of V-shaped troughs 24. Supporting troughs 24 are moved from station to station through the delaminating apparatus 20 intermittently by a conveying mechanism 25. Mechanism 25 preferably includes supporting brackets 26 at opposite ends of each trough 24 and is provided with a power operated drive mechanism 25 such as an electrically driven chain or belt drive.

In the illustrated embodiment the apparatus utilized for separating laminations 22 is illustrated to have six separate stages labeled A-F, inclusive Troughs 24 pass intermittently through each of these stages. It will be understood that the process of the present invention can be practiced using the apparatus in which a greater or smaller number of stages is employed. If desired, a single station could be utilized. However, the illustrated embodiment is preferred in that a higher volume of laminations can be separated through the use of multiple stations as illustrated.

Figures 2, 12:
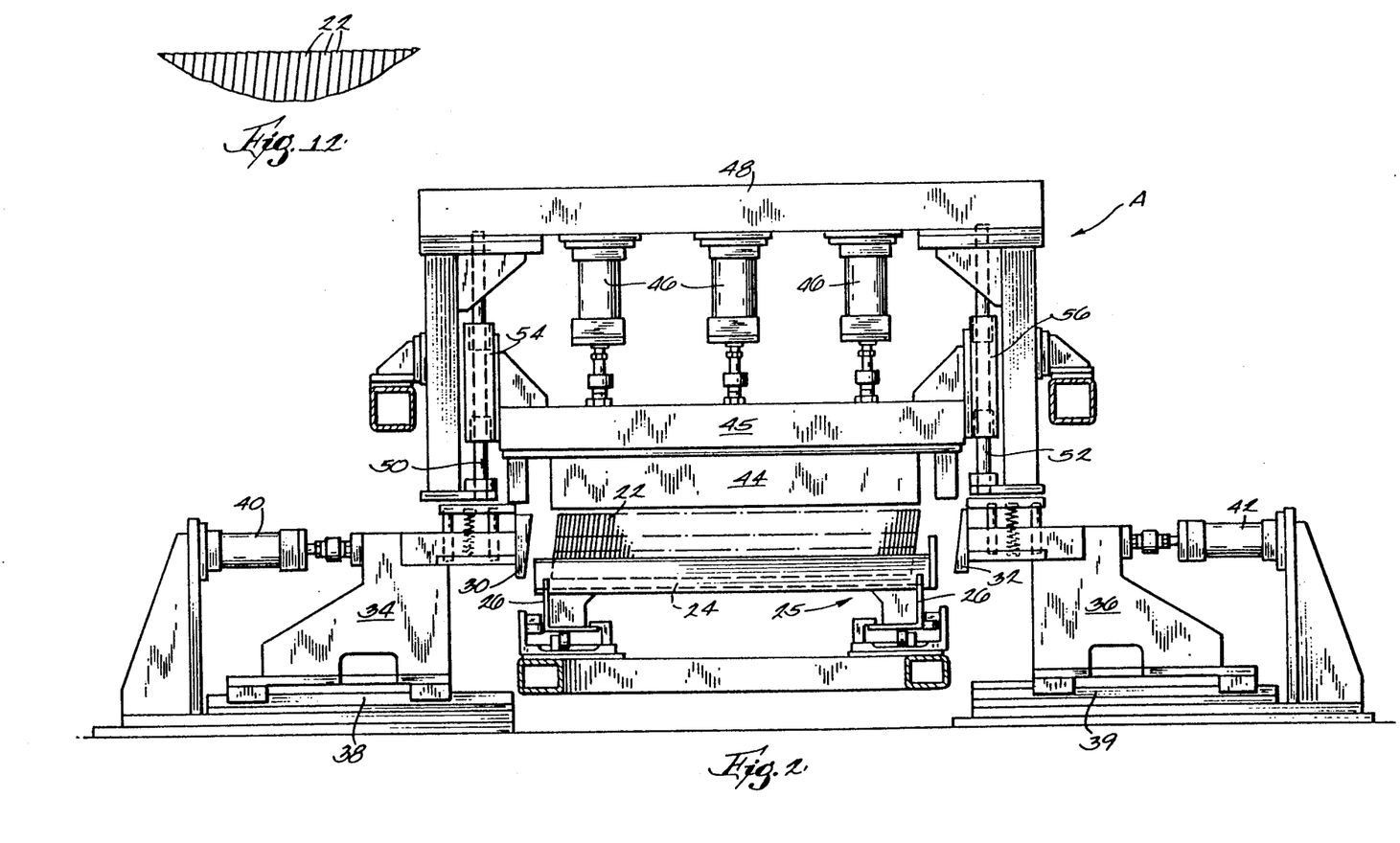
FIG. 2 is a cross sectional view taken along Line 2—2 of FIG. 1 with platens and compacting bar in the retracted position.
FIG. 12 is a fragmentary cross-sectional view taken along line 12—12 of FIG. 1.
Figure 3:
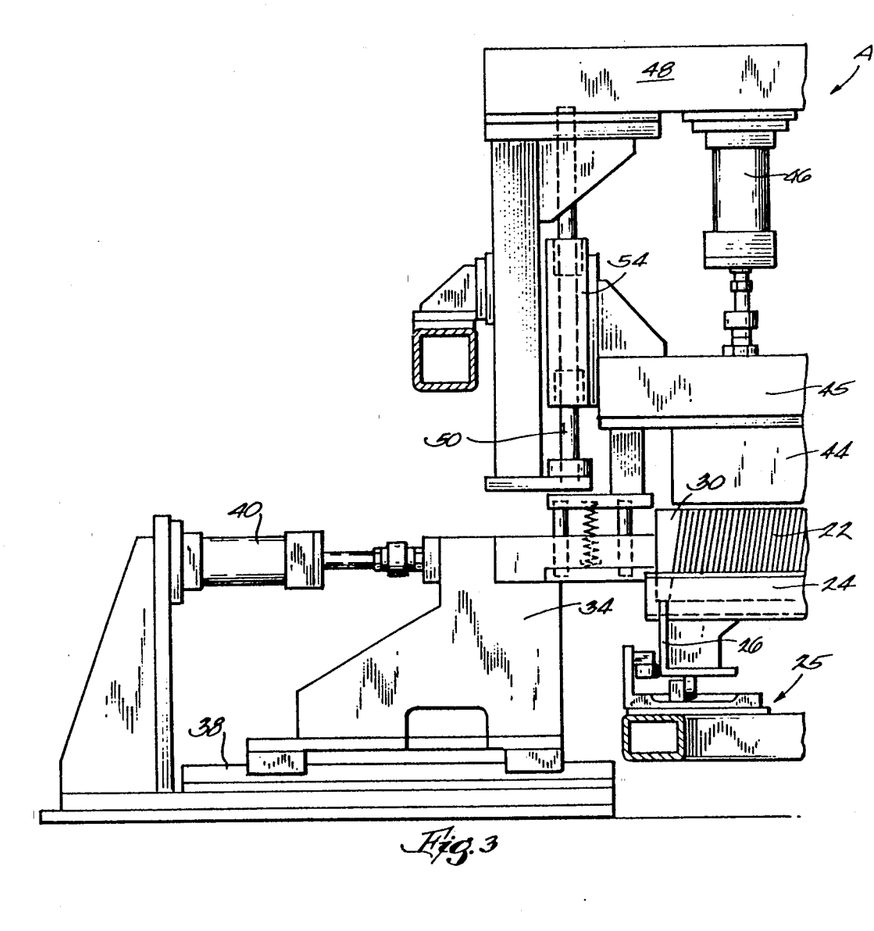
FIG. 3 is a fragmentary side view of the apparatus shown in FIG. 2 with the platens advanced to engage a row of laminations.
Figure 4:
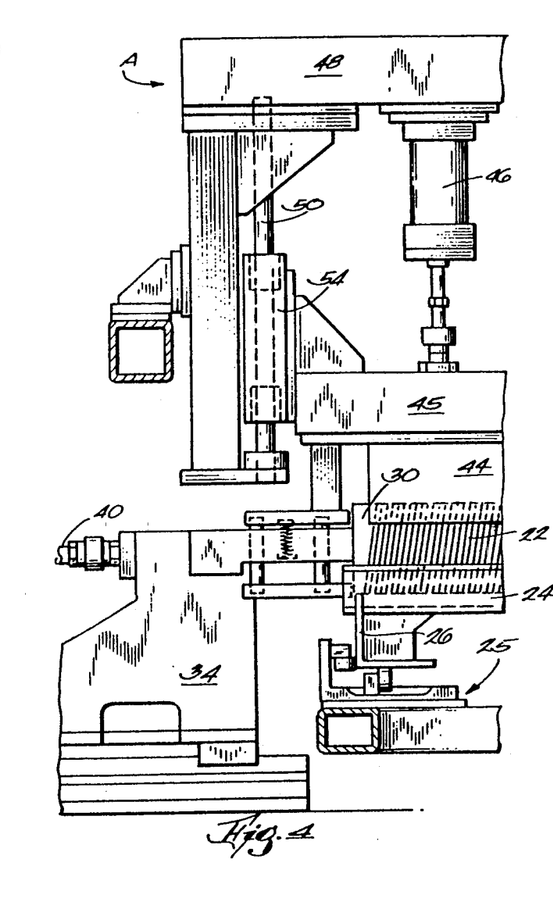
FIG. 4 is a fragmentary elevational side view of the apparatus of FIG. 3 with a lamination compacting device in contact with the row of laminations.

In the illustrated embodiment as best seen in FIGS. 2-4, station A includes a pair of opposed platens 30 and 32 having surfaces that are parallel to each other but tilted from the vertical, for example, at 7° from the vertical In stage A a row of laminations 22 is engaged at opposite ends by the platens 30 and 32. In this stage the laminations are seated in trough 24 and are pressed together into a uniform stack.

Platens 30 and 32 are supported on a pair of guided supports 34 and 36. Supports 34 and 36 travel on rails 38 and 39 upon which they are guided. Platens 30 and 32 are advanced and retracted by means of a pair of hydraulic cylinders 40 and 42 which move the platens from their retracted position shown in FIG. 2 to the advanced position shown in FIG. 3 wherein they compress the opposite ends of the row of laminations 22.

A compacting or breaker bar 44 is utilized to tap or compress the rows of laminations 22 into uniform contact in trough 24. Breaker bar 44, which may in the form of an inverted angle iron is supported on a cross member 45 which can be raised and lowered by a series of hydraulic cylinders 46 that are suspended and attached to superstructure 48. Cross member 45 is guided upon guide rods 50 and 52 at its opposite ends by means of guiding collars 54 and 56. In FIG. 4 bar 44 is shown in its lowered position in contact with row 22. In FIG. 3 the cylinders 46 are shown in their retracted position so that bar 44 is not in contact with the laminations 22.

Figure 5:
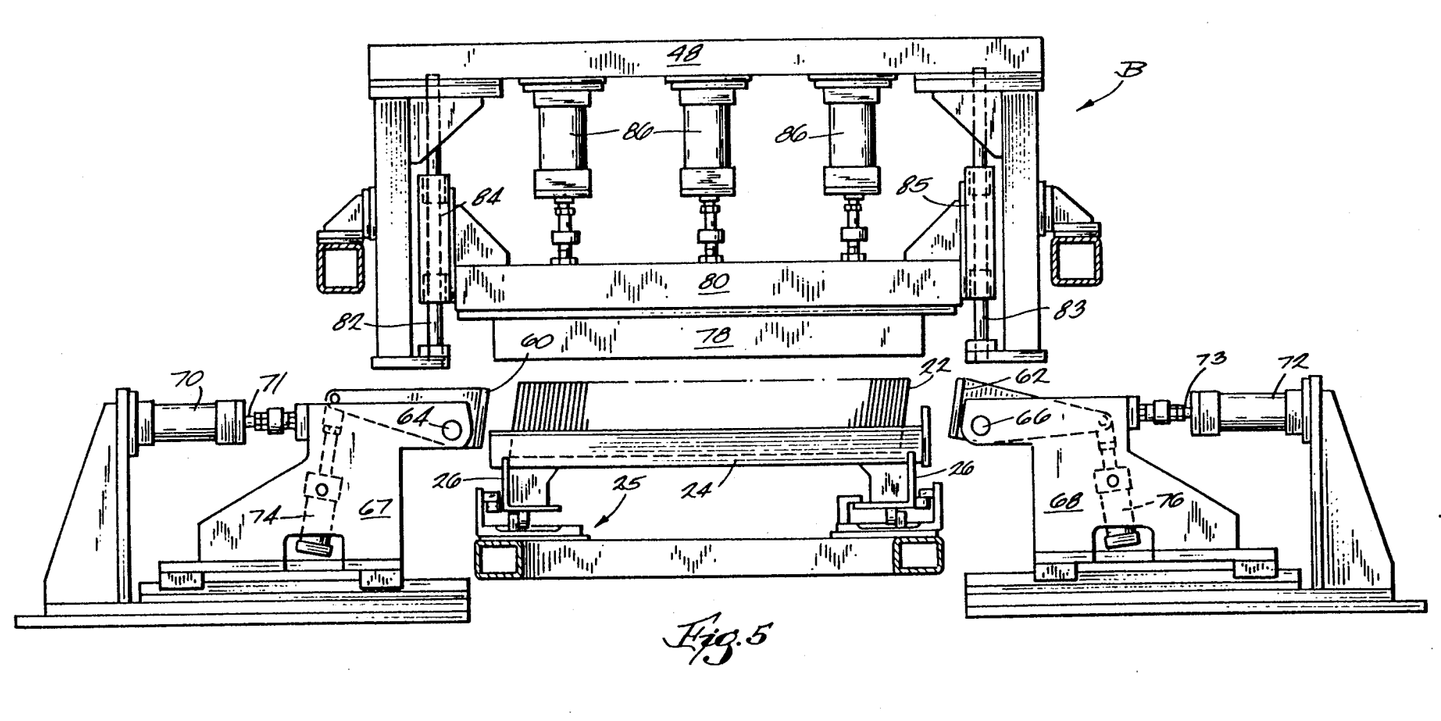
FIG. 5 is a cross-sectional view taken along line 5—5 of FIG. 1 showing a row of laminations with compacting platens disengaged therefrom.
Figure 6:
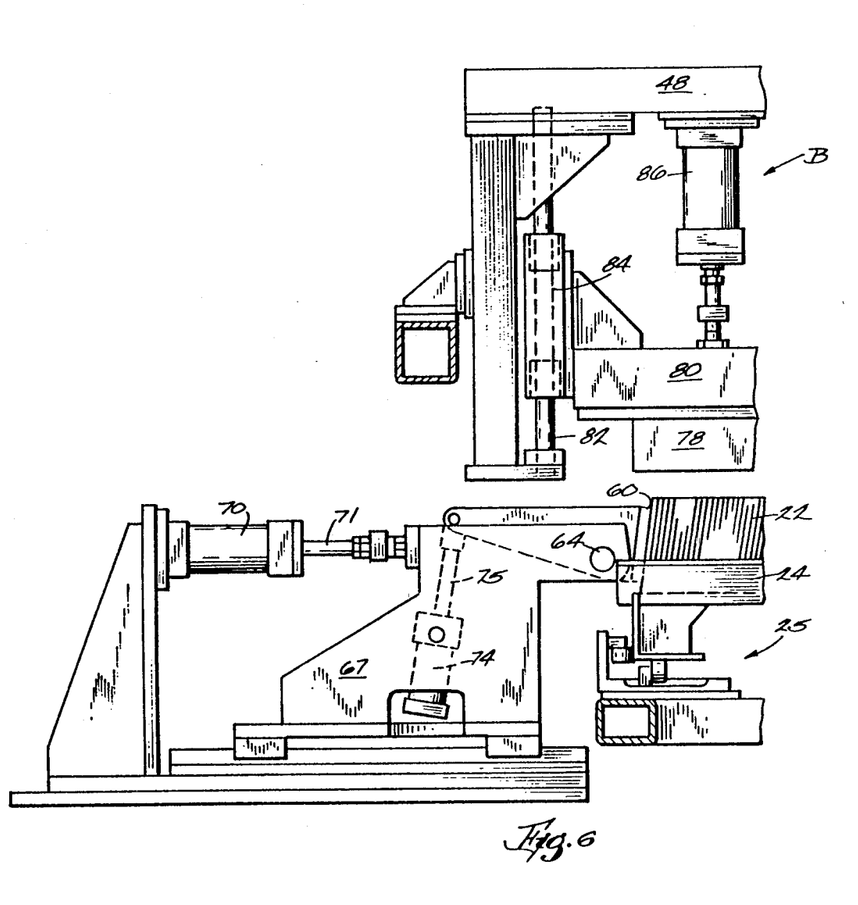
FIG. 6 is a fragmentary side elevational view of the apparatus of FIG. 5 showing the compressing platens in engagement with a row of laminations.
Figure 7:
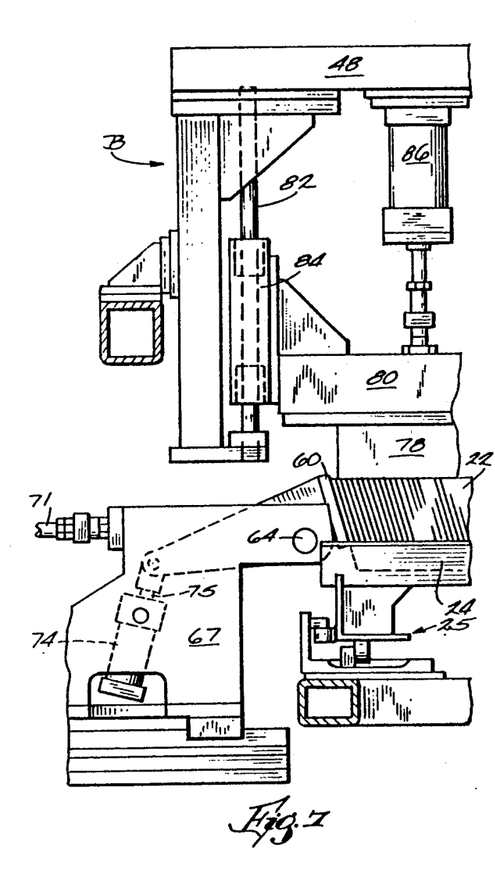
FIG. 7 is an elevational side fragmentary view of the apparatus of FIG. 6 showing tilting of the row of laminations in the reverse direction with a breaker bar in contact with the row.

Referring to FIGS. 5-7, there is shown the next stage in the separation process identified as stage B. In this stage a pair of opposed platens 60 and 62 are also arranged so that the faces thereof are parallel to each other and can be tilted at various angles relative to the longitudinal axis of supporting trough 24. To this end platens 60 and 62 are pivotally attached at a pivot point 64 and 66, respectively, on a pair of opposed guided carriers 67 and 68, respectively. Platens 60 and 62 can be advanced toward laminations 22 or retracted therefrom by hydraulic cylinders 70 and 72 which extend and retract piston rods 71 and 73, respectively. Platens 60 and 62 can be pivoted about pivot points 64 and 66 by means of hydraulic cylinders 74 and 76, respectively. As seen in FIG. 6, platen 60 has been advanced against one end of row of laminations 22 at a first angle.

Figure 1:
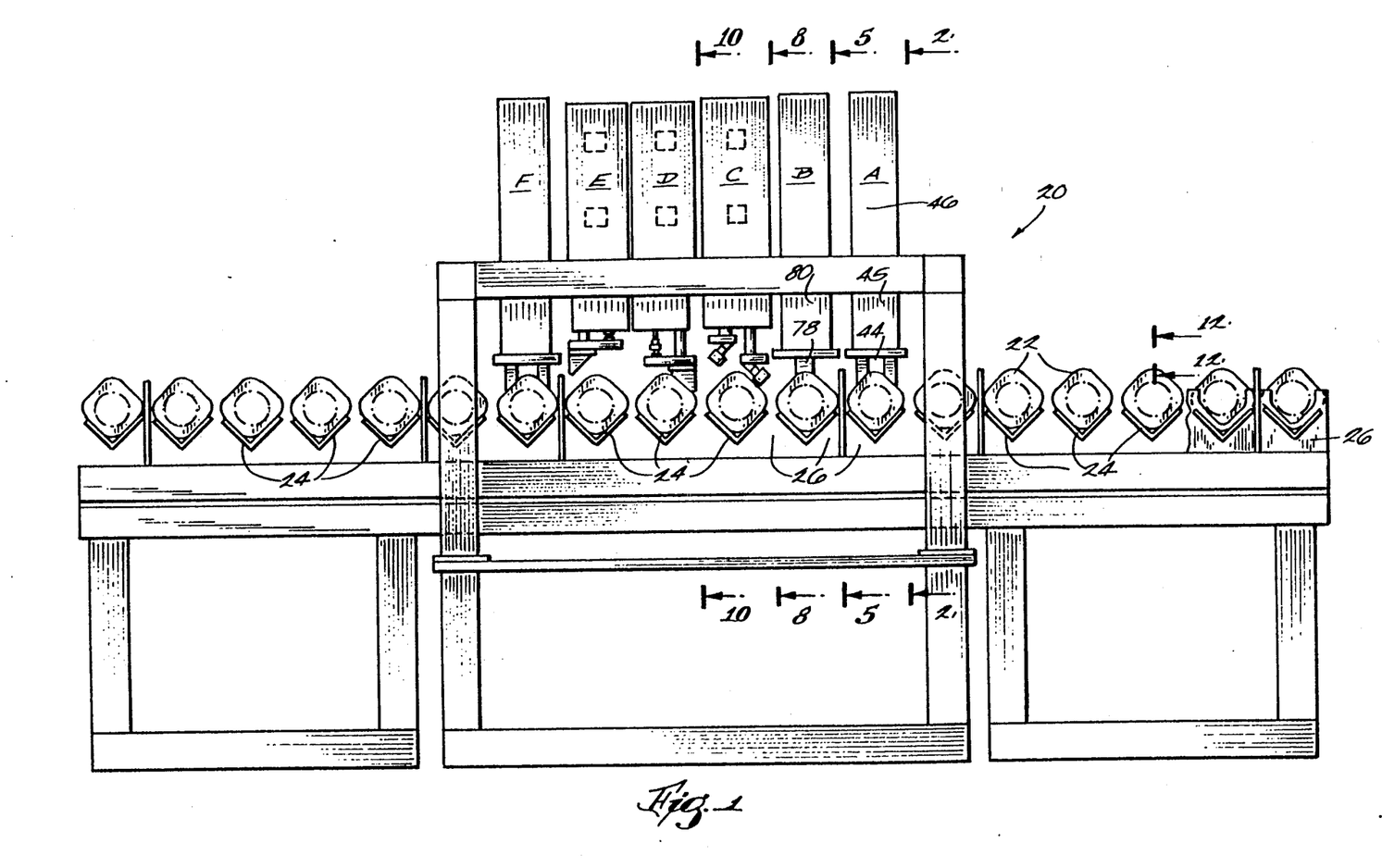
FIG. 1 is a side elevational view showing the process and apparatus of the invention with rows of laminations viewed from an end.

As seen in FIG. 7, end 60 has been advanced against a row of laminations 22 at a different angle relative to trough 24. Note that in the case of FIG. 6, piston rod 75 is extended out of hydraulic cylinder 74 whereas in the orientation shown in FIG. 7, piston rod 75 has been retracted into hydraulic cylinder 74 so as to cause platen 60 to be tilted in the reverse direction by rotation about pivot point 64. Another breaker bar 78 is located at station B to strike the row of laminations 22 first when tilted to the right as shown in FIG. 6 and subsequently again when tilted to the left as shown in FIG. 7. Bar 78 is preferably provided with a concave surface as shown in FIG. 1 to match the contour of the row of laminations.

Bar 78 is carried by a cross member 80 that is guided on rods 82 and 83 at its opposite ends by means of guiding collars 84 and 85 which are slidable along guide rods 82 and 83, respectively. Cross member 80 is lowered and raised by means of a series of hydraulic cylinders 86 which are supported on super-structure 48. When breaker bar 78 strikes row of laminations 22 while supported in tray 24 first in the orientation shown in FIG. 6 and subsequently again as shown in FIG. 7, shearing forces are caused between the individual laminations causing them to slide relative to each other first in one direction and then in the reverse direction.

Figure 8:
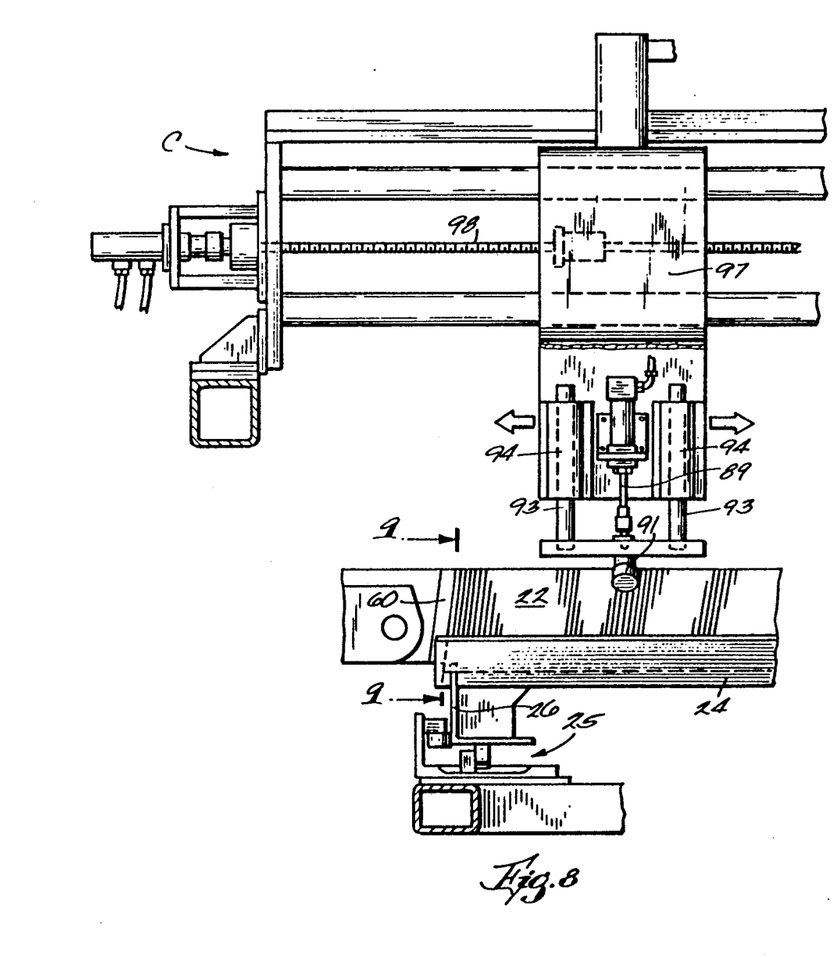
FIG. 8 is a fragmentary cross-sectional view taken along line 8—8 of FIG. 1.
Figure 9:
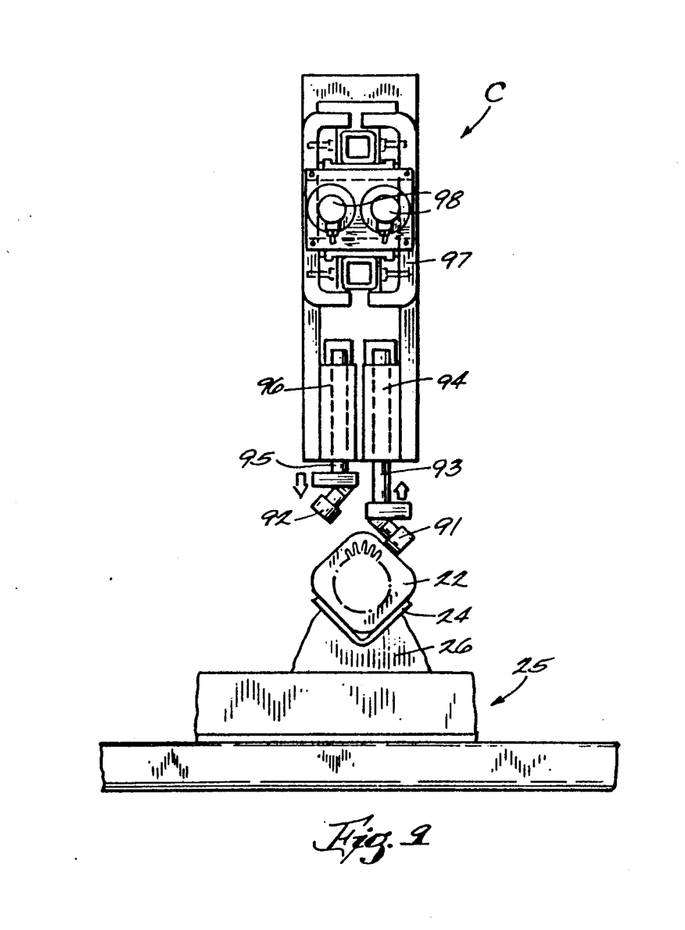
FIG. 9 is an end view taken along line 9—9 of FIG. 8.

Referring now to FIGS. 8 and 9, station C is illustrated. In this station row of laminations 22 is compacted first on one side and then on another by a pair of rollers 91 and 92 that are caused to roll down the length of the laminations 22 first when tilted in one direction and then in the opposite direction while held between a pair of platens 60 and 62 identical to those shown in reference to station B. Roller 91 is supported by an extendable and retractable rod 89 that is actuated by a hydraulic cylinder 90. Similarly, roller 92 is extended and retracted by means of a rod 95 activated by a cylinder 96. Guide rods 93 slidably positioned in collars 94 support and guide each roller assembly as it is extended and retracted. Rollers 91 and 92 are supported on a traveling supporting frame 97 that is guided for travel parallel to the row of laminations by guide rods 98. Frame 97 is driven by a rotatable threaded member 99 which is actuated by hydraulic motor 10. Preferably, rollers 91 and 92 are spring biased into contact with laminations 22 so that a relatively constant pressure can be maintained by the rollers as they traverse the length of the row of laminations. The rollers travel along the laminations when they are first tilted in the orientation shown in FIG. 8 and again after they have been tilted to a different orientation, for example, as that shown in FIG. 7. In this way shearing forces are applied to the individual laminations at different angles than were applied in station B.

Figure 10:
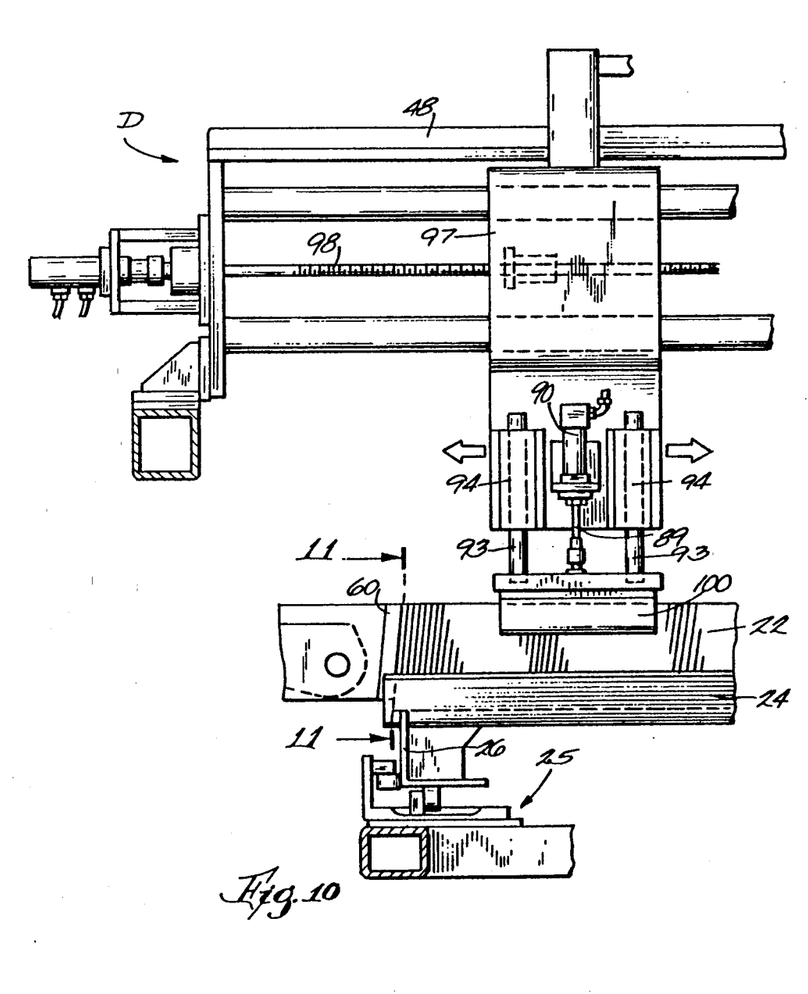
FIG. 10 is a fragmentary cross-sectional view taken along line 10—10 of FIG. 1.
Figure 11:
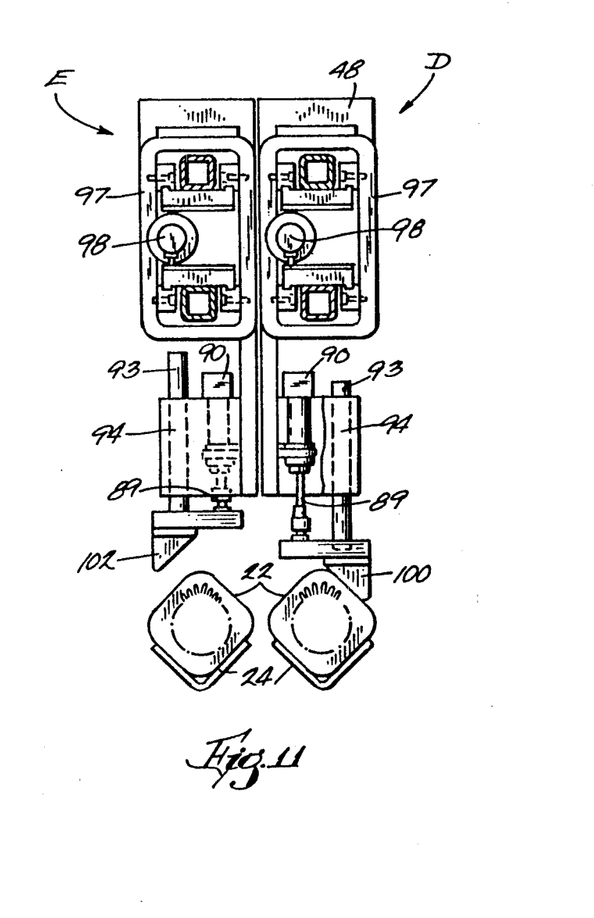
FIG. 11 is a fragmentary end view taken along line 11—11 of FIG. 10.

Stages D and E are seen in FIGS. 10 and 1. In this stage vibratory compactors 100 and 102 are employed Vibratory impact bars or compactors 100 and 102 are pneumatically operated reciprocating devices that operate similar to an air hammer reciprocating at a minimum of 15 to 20 blows per second. They are preferably provided for linear travel along row of laminations at the rate of about 6 feet per minute. As seen in FIG. 10, vibratory bar 100 is reciprocated by a pneumatically operated reciprocating rod 89 that is caused to oscillate by a pneumatic device 90. Impact device 100 is supported on a super-structure 48 by means of a traveling support 97 which may be moved linearly, along guide-rods 98, for example, by means of a rotatable threaded member 99 similar to that used in connection with station C. Station E shown in FIG. 11 operates on the same principle as that of Station D with the exception that head 102 is adapted to strike the opposite surface of the row of laminations than that impacted by head 100. As in the case of stations B and C, platens 60 and 62 are tilted first in one direction and then in the opposite direction while the row of laminations is impacted by each of members 100 and 102.

Station F is in all respects identical to section A and thus is not separately shown in detail. Thus, the station is identical to that shown in FIGS. 2-4.

While the row of platens can be moderately compressed between platens 30 and 32 or 60 and 62 during the cracking stages, it is preferred that they simply be used to contain the ends of the rows of laminations to maintain them at the desired slant without the use of compressive force. Any significant compressive force will tend to prevent the desired sliding between the contacting laminations to occur and thus is not preferred. Preferably, the mechanisms used to cause cracking forces at each station are adjustable so that optimum results can be achieved by trial and error with reference to any particular type of lamination that is separated.

While preferred embodiments of the invention have been shown for purposes of illustration, it will be readily apparent to those skilled in the art that modifications can be made falling within the spirit of the invention and the appended claims.

What is claimed is:

1. A process for separating individual laminations comprising:
    positioning a row of the laminations against a supporting surface,
    engaging the opposite ends of said row between platens which are oriented parallel to each other at a first angle relative to the axis of said row,
    holding the row between said platens,
    applying a force against a side of said row to compact the same against said supporting surface while said row is held between said platens,
    releasing said force and said platens,
    engaging the opposite ends of said row between platens which are oriented parallel to each other but at a second angle relative to the axis of said row,
    compressing the row between said platens,
    compacting said row between a compacting surface and said supporting surface while held between said platens,
    releasing said compacting surface and said platens from said row,
    at least one of said first and second angles being an oblique angle.

2. A process according to claim 1 wherein said second angle is inclined in the opposite direction from a plane vertical to said supporting surface to said first angle so that shearing forces in one direction occur between said laminations during said first compressing step and shearing forces in a different direction between said laminations occurs during said second compressing step.

3. A process according to claim 1 wherein said compacting surface comprises an elongated striking bar.

4. A process according to claim 1 wherein said compacting surface comprises a roller that travels along the length of said row.

5. A process according to claim 1 wherein said compacting surface comprises a vibratory member that moves along the length of said row.

6. A process according to claim 1 wherein said supporting surface comprises a V-shaped trough.

7. A process according to claim 1 wherein a plurality of said rows are advanced intermittently in sequence through a plurality of compacting stations wherein the angle at which said rows are inclined are repeatedly reversed and said rows are sequentially compacted by a plurality of differing compacting devices.

8. A process according to claim 7 wherein said compacting devices sequentially include elongated striking bars, rollers that travel along the length of said rows, and vibratory compacting means that travels along the length of said rows.

9. A process according to claim 8 wherein said compacting devices contact and compress different surfaces of said row so that shearing forces between said laminations occur in a plurality of directions.

10. Apparatus for separating individual laminations comprising:
    a supporting surface,
    a pair of platens for engaging the opposite ends of a row laminations, said row having a longitudinal axis said platens being oriented parallel to each other at an oblique angle relative to said axis,
    means for advancing and retracting said platens to compress the row of laminations between said platen, and wherein said platens are pivotable and said apparatus comprises means for pivoting the same so that the opposite ends of said row can be engaged and compressed between said platens at a second angle relative to said axis, and,
    means for applying a force against a side of said row to compact the same against said supporting surface while said row is held between said platens.

11. An apparatus according to claim 10 wherein said second angle is inclined in the opposite direction from a plane vertical to said supporting surface to said first angle so that shearing forces in one direction occur between said laminations during said first compressing step and shearing forces in a different direction between said laminations occurs during said second compressing step.

12. An apparatus according to claim 10 wherein said compacting means comprises an elongated striking bar.

13. An apparatus according to claim 10 wherein said compacting means comprise rollers that travel along the length of said row.

14. An apparatus according to claim 10 wherein said compacting means comprise vibratory members that move along the length of said row.

15. An apparatus according to claim 10 wherein said supporting surface comprises a V-shaped trough.

16. An apparatus according to claim 15 wherein a plurality of said rows are advanced intermittently in sequence through a plurality of compacting stations wherein the angle at which said rows are inclined are repeatedly reversed to an equal but negative angle from the vertical and said rows are sequentially compacted by a plurality of differing compacting devices.

17. An apparatus according to claim 15 wherein said rows are advanced through a plurality of stations wherein said rows are in sequence compacted by a series of compacting devices including elongated striking bars, rollers that travel along the length of said rows, and vibratory compacting means that travels along the length of said rows.

18. An apparatus according to claim 15 wherein said compacting devices contact and compress a plurality of different lateral surfaces of said row so that shearing forces between said laminations occur in a plurality of directions.

* * * * *